D. FROST.
Band-Cutting Feeder for Thrashing-Machine.
No. 159,663.
Patented Feb. 9, 1875.
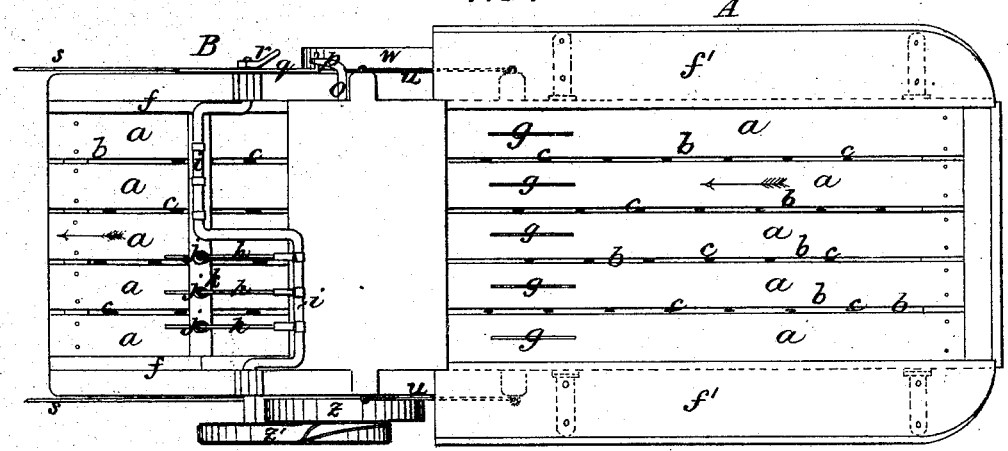
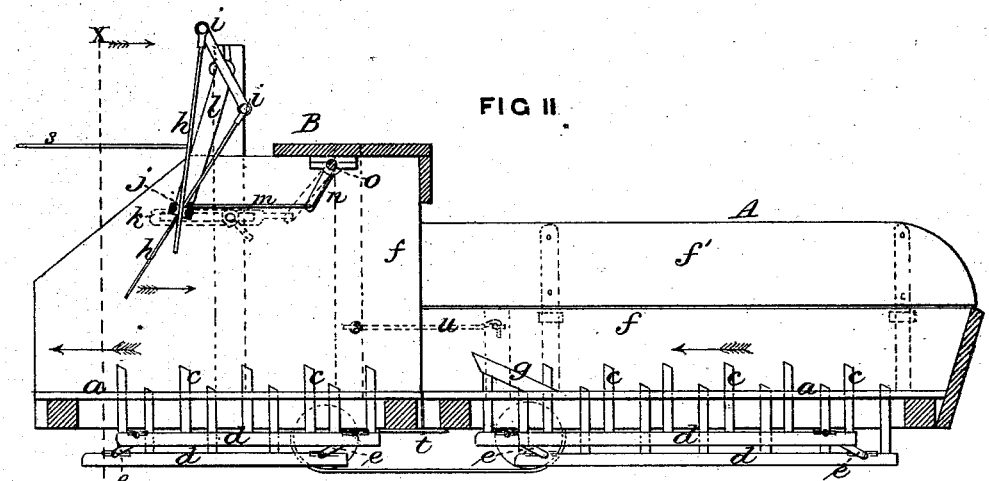
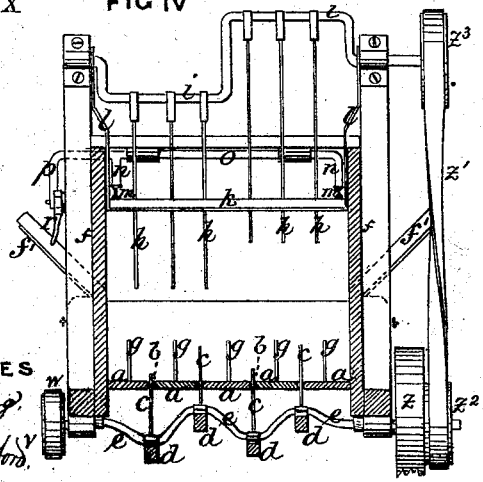
WITNESSES
John E. Laing
J. A. Rutherford
INVENTOR
David Frost
By Johnson and Johnson
his Attys.

2 Sheets--Sheet 2.
D. FROST.
Band-Cutting Feeder for Thrashing-Machine.
No. 159,663. Patented Feb. 9, 1875.
FIG V
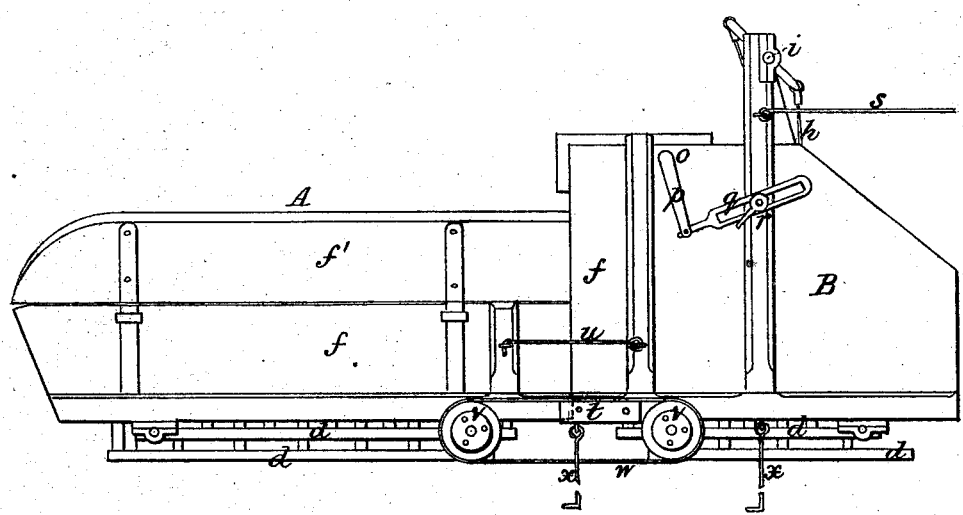
FIG VI
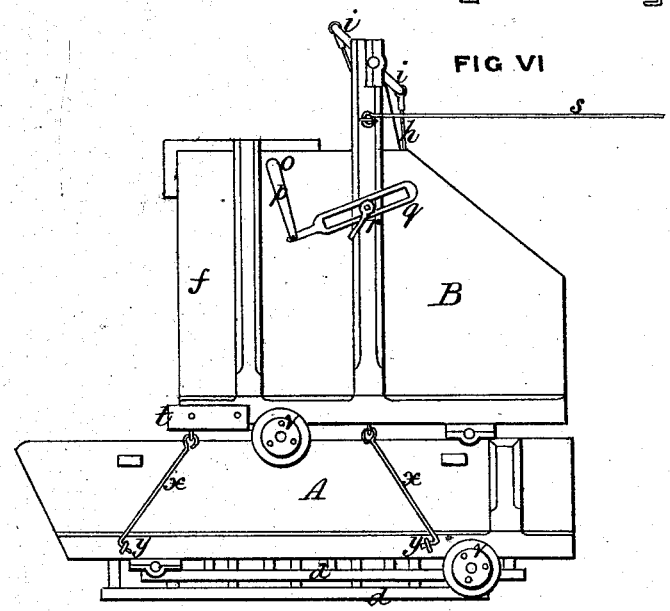
WITNESSES
John E. Laing
J.H. Rutherford
INVENTOR
David Frost
By Johnson and Johnson
his Attys.
THE GRAPHIC CO. PHOTO-LITH. 39 & 41 PARK PLACE, N.Y.

UNITED STATES PATENT OFFICE.

DAVID FROST, OF LATROBE, PENNSYLVANIA, ASSIGNOR OF ONE-HALF HIS RIGHT TO MICHAEL P. SCHALL, OF SAME PLACE.

IMPROVEMENT IN BAND-CUTTING FEEDERS FOR THRASHING-MACHINES.

Specification forming part of Letters Patent No. 159,663, dated February 9, 1875; application filed December 3, 1874.

*To all whom it may concern:*

Be it known that I, DAVID FROST, of Latrobe, in the county of Westmoreland and State of Pennsylvania, have invented certain new and useful Improvements in Band-Cutters and Feeders for Thrashing-Machines; and I do hereby declare that the following is a full, clear, and exact description thereof, which will enable others skilled in the art to which it pertains to make and use the same, reference being had to the accompanying drawings, and to the letters of reference marked thereon, which form a part of this specification.

The invention herein relates to a combined band-cutter and feeder for thrashing-machines, in which the sheaf is thrown upon the feeding-platform, and, as it is carried forward to the thrashing-cylinder, the band is cut and the grain thereby made loose for the action of the cylinder.

The improvements I have made in such machine consist, first, in the combination, with the longitudinally-reciprocating rising and falling teeth of a platform grain-feeder, of fixed blades arranged between the feeding-teeth to cut the sheaf-band as the grain is fed forward to the thrasher; second, in the combination, with the longitudinally-reciprocating rising and falling teeth of a platform-feeder, of fingers having rising, falling, and vibrating movements, in order to dive down, enter the grain, and move slightly frontward to retard, and thereby regulate and straighten, its feed to the cylinder; third, in the combination, in a feeder for thrashing-machines having a slotted platform and longitudinally-reciprocating rising and falling teeth, of regulating-fingers and a guide-bar therefor, with the operating double crank-shaft, whereby the regulating-fingers are operated in sets in connection with the feeding movement of the teeth; fourth, in the combination, with the regulating-fingers, their operating crank-shaft, and their guide-bar, of a slotted link and crank-rod connecting with the guide-bar, for effecting the adjustment of the latter to increase or diminish the vibrating stroke or retarding action of the fingers upon the grain; and, finally, of a grain-feeder made in sections, having separate operating-shafts, and provided with sockets, suspending securing-hooks and connecting-hooks, whereby the receiving-section of the platform may be held in normal position, or separated and suspended to and beneath the section carried by the thrasher, to render the machine more compact and convenient.

In the accompanying drawings, Figure 1 represents a top view of a machine embracing my invention; Fig. 2, a vertical longitudinal section thereof; Fig. 3, a similar view, showing the regulating-arms in a different position; Fig. 4, a transverse section taken at the line $x\ x$ of Fig. 2; Fig. 5, a side elevation of the machine, and Fig. 6 an elevation showing the front section of the platform separated and suspended beneath the section carried by the thrasher, to render the machine compact for transportation. The feeding-platform for the grain is combined with the thrashing-cylinder in the usual manner, so that the grain is fed from said platform directly into the thrasher. The platform is constructed of longitudinal slats $a$, with intervening openings $b$, extending from one end of the platform to the other, and within which teeth $c$ rise and fall by an advance and receding movement to extend above the platform while moving forward to feed the grain to the thrasher, and to descend beneath the platform to move back beneath the grain in position to again rise and carry the grain forward. These teeth $c$ are secured at their lower ends to horizontal bars $d$, which are carried by crank-shafts $e$, mounted in bearings in the sill-pieces of the platform. The cranks $e$ are placed in pairs, at right angles to each other, in a manner to produce the feeding movement of the grain over and above the platform, as above stated. The platform is provided with fixed and removable side boards $f\ f'$ to confine the grain which is thrown upon the front portion of the platform in sheaf, and in this condition is fed forward over and upon fixed cutters $g$ until the sheaf-band, coming in contact with them, is cut and separated into several parts, leaving the sheaf free and loose, so that it can be more readily carried forward. These band-cutters $g$ are fixed blades rising in inclined positions from the slats toward the cylinder, so that their acting edges will receive the sheaf-band as it is fed forward, and, as the latter rises over them, the weight of the sheaf and its riding movement directly upon the cutters will sever the band with absolute certainty, and allow the grain to be fed as freely as if they were not put in its path.

The feed of the grain often crowds and chokes the thrasher, and the latter has to be relieved by pulling the grain back by hand in order to make a clean thrashing. A too rapid feed will choke the cylinder and waste the grain, and dry light grain will feed faster than damp heavy grain. By my improvement the feed of the grain is regulated, without regard to its condition or the rapidity of movement of the feeding-teeth, by means of fingers $h$, vibrating above the feeding-platform and just in front of the thrashing-cylinder. These vibrating fingers $h$ are suspended in separate series from a double crank-shaft, $i$, mounted in side standards, some distance above the platform. These fingers are suspended from the cranks by loose joints, and they pass through guide-holes $j$, in a horizontal cross-bar, $k$, so that in their descending movements, by their cranks, this cross-bar imparts to them their vibrating movement—that is to say, one series at a time is caused to dive down obliquely toward the thrashing-cylinder, the limit of the stroke of their cranks to cause their ends to penetrate the grain, and then to move toward the front, away from the said cylinder, to retard the feed by pushing the grain back, or in a direction contrary to that in which it is fed by the platform-teeth. The guide-holes $j$ in the cross-bar $k$ are bell-shaped to allow of this movement.

To regulate the degree of the vibration of these hanging fingers, the cross-bar is suspended by side arms $l$, pivoted to the crank-shaft standards in a line with the axis thereof, while the bar $k$, or its arms $l$, is connected by link-rods $m$ to the lower ends of arms $n$, depending from a horizontal rod, $o$, crossing the top of the frame, and provided at one end with a crank, $p$, to which a slotted link, $q$, Fig. 5, is attached, and clamped by a clamp-nut, $r$, to the frame, so that by unclamping this link $q$, and moving it toward or from the thrashing-cylinder, the connections with the guide-bar $k$ of the regulating-fingers will move said bar $k$ toward the front, and the degree of such movement will proportionately lessen the degree of the vibration of the fingers, and thus allow the grain to be fed faster, because their lower ends do not have as much backward vibration as when the fingers are set farther back or toward the thrashing-cylinder, and by this means the grain is held or stopped more or less in its feed upon the platform—in other words, the feed of the teeth $c$, being faster than is required to feed the cylinder, the regulator serves to check such feed more or less, as may be desired, the regulator acting as a hold-back for the grain, and operates to let it pass to the cylinder faster or slower.

In addition to this regulating function of the fingers, they also serve to pick and straighten the grain, and to separate it evenly for its entrance into the cylinder.

The feeding platform is secured in position with the mouth of the thrasher by two hinged rods, $s$, or in any suitable way.

To render this platform more compact and convenient for transportation with the thrasher, I construct it in two separate sections, A B, which, when put together for use, the receiving portion A is supported upon holding-plates $t$, Figs. 2, 3, 5, secured to side sills of the inner section, and fastened by hook-rods $u$ on the sides, as shown in Fig. 5. Each section is, therefore, fitted with its separate series of cranked rods $e$ and bars $d$, for carrying the feeding-teeth $c$, and the two inner crank-rods of these sections are provided each with a pulley, $v$, and a band, $w$, leading from one to the other, drives the separate sets of feeding-teeth.

When the machine is to be transported, the outer section, A, is unhooked, and the side-boards $f'$ are taken off and laid upon the platform, and this section is then suspended in position beneath the inner section by means of hooks $x$ hooked into the eyes $y$ on the lower part, as shown in Fig. 6, thus greatly reducing its length, and making it much more convenient for carriage.

The inner crank-rod of the inner section has a pulley, $z$, from which a band leads to a pulley on the shaft of the thrashing-cylinder, and a crossed band, $z^1$, leads from a small pulley, $z^2$, on the crank-rod of the driving-pulley to a pulley, $z^3$, on the crank-shaft $i$, to give motion both to the feeding-teeth of the platform and the regulating-fingers.

I claim—

1. The combination, with the longitudinally-reciprocating rising and falling teeth $c$ of a platform grain-feeder, of the fixed blades $g$, arranged between the feeding-teeth openings, to cut the sheaf-band, substantially as herein set forth.

2. The combination, with the longitudinally-reciprocating raising and falling teeth $c$ of a platform grain-feeder, of fingers $h$, having rising, falling, and vibrating movements, in order to dive down, enter the grain, and retard, and thereby regulate, its feed to the cylinder.

3. The combination, in a feeder for thrashing-machines having a slotted platform and longitudinally-reciprocating rising and falling teeth $c$, of the regulating-fingers $h$, and their guide-bar $k$, with the operating double crank-shaft $i$, whereby the fingers are operated in sets, in connection with the feeding movement of the teeth, substantially as and for the purpose herein set forth.

4. The combination, with the regulating-fingers $h$, their operating crank-shaft $i$, and their guide-bar $k$, of the slotted link $q$, and crank-rod $o$, connecting with the guide-bar $k$, for effecting the adjustment of the latter to increase or diminish the retarding action of the fingers upon the grain.

5. The within-described grain-feeder, made in sections A B, having separate operating shafts $e\ e$, and provided with socket-supports $t$, securing-hooks $u$, and connecting-hooks $x$, whereby the receiving-section A of the platform may be held in normal position, or separated and suspended to and beneath the section carried by the thrasher, to render the machine more compact and convenient.

In testimony that I claim the foregoing I have affixed my signature in presence of two witnesses.

DAVID FROST.

Witnesses:
A. E. H. JOHNSON,
J. W. HAMILTON JOHNSON.